(12) United States Patent
Sylvest et al.

(10) Patent No.: US 7,483,971 B2
(45) Date of Patent: Jan. 27, 2009

(54) METHOD AND APPARATUS FOR MANAGING COMMUNICATIVELY COUPLED COMPONENTS USING A VIRTUAL LOCAL AREA NETWORK (VLAN) RESERVED FOR MANAGEMENT INSTRUCTIONS

(75) Inventors: Mikael Sylvest, Birkeroed (DK); Bent Kuhre, Vallensbaek (DK)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 10/113,849

(22) Filed: Mar. 28, 2002

(65) Prior Publication Data
US 2003/0188003 A1    Oct. 2, 2003

Related U.S. Application Data

(60) Provisional application No. 60/288,763, filed on May 4, 2001.

(51) Int. Cl.
*G06F 13/00* (2006.01)
(52) U.S. Cl. .................................................... 709/224
(58) Field of Classification Search ................ 709/223, 709/224
See application file for complete search history.

(56) References Cited

U.S. PATENT DOCUMENTS

| | | | | |
|---|---|---|---|---|
| 5,751,967 A | * | 5/1998 | Raab et al. | 709/228 |
| 6,131,034 A | * | 10/2000 | McLaughlin et al. | 455/450 |
| 6,188,691 B1 | * | 2/2001 | Barkai et al. | 370/390 |
| 6,356,551 B1 | * | 3/2002 | Egbert | 370/389 |
| 6,714,544 B1 | * | 3/2004 | Bosloy et al. | 370/395.1 |
| 6,856,591 B1 | * | 2/2005 | Ma et al. | 370/216 |
| 6,885,657 B1 | * | 4/2005 | Rabenko et al. | 370/352 |
| 7,022,017 B1 | * | 4/2006 | Halbritter et al. | 463/42 |
| 7,039,724 B1 | * | 5/2006 | Lavian et al. | 709/250 |
| 7,269,639 B1 | * | 9/2007 | Lawrence | 709/220 |
| 2002/0107984 A1 | * | 8/2002 | Rawson, III | 709/246 |
| 2002/0133534 A1 | * | 9/2002 | Forslow | 709/200 |
| 2002/0176430 A1 | * | 11/2002 | Sangha et al. | 370/412 |

* cited by examiner

*Primary Examiner*—Robert B Harrell
(74) *Attorney, Agent, or Firm*—Blakely, Sokoloff, Taylor & Zafman LLP

(57) ABSTRACT

A method and apparatus provide unified systems and network management of aggregates of separate systems. User data and management instructions are received in a system of communicatively coupled components. At least one system manager administrates the communicatively coupled components using a virtual local area network (VLAN) reserved for the management instructions. The user data is sent to at least one of the communicatively coupled components as allowed by the management instructions.

8 Claims, 6 Drawing Sheets

100

US 7,483,971 B2

METHOD AND APPARATUS FOR MANAGING COMMUNICATIVELY COUPLED COMPONENTS USING A VIRTUAL LOCAL AREA NETWORK (VLAN) RESERVED FOR MANAGEMENT INSTRUCTIONS

This utility application claims the benefit of U.S. Provisional Patent Application Ser. No. 60/288,763 filed May 4, 2001, entitled "Method for the Provision of Unified Systems and Network Management of Aggregates of Separate Systems".

TECHNICAL FIELD

The present invention generally relates to the field of data networks and more particularly, to a method for the provision of unified systems and network management of aggregates of separate systems.

BACKGROUND

The emphasis in connectivity technology for computing devices has evolved from coupling a few isolated devices through serial ports or primitive local area networks (LANs) to coupling worldwide internets that connect millions of users and incorporate server banks storing vast amounts of knowledge and routine data. As the worldwide web of networks expands, the devices that perform the networking become proportionately more powerful and sophisticated. As a result, administration of the networks and management of the devices that perform the networking grow correspondingly complex.

Analogous to an early phase of the personal computer revolution, during which management was often cumbersome due to incompatible hardware elements requiring separate management and troubleshooting, the management of evolving networks and aggregates of separate systems is likewise often cumbersome because many of the switches, bridges, routers, repeaters, hubs, and software protocols that perform the networking have evolved separately and require separate management and troubleshooting. The numerous devices, each requiring separate administration, present a problem for remote management.

Although there are countless devices in need of unified management, there are some networking devices that are almost always used in any sizeable network. One widely-used component for network connectivity is the network data switch, such as an Ethernet switch adhering to the Ethernet standard topology, defined within the 802.3 standards committee of the Institute of Electronic and Electrical Engineers (IEEE). Ethernet allows all hosts on a network to share the same bandwidth of a link, and has become popular because it is easy to add new technologies such as Fast-Ethernet and Gigabit-Ethernet to existing network infrastructures. Over the last decade, the Ethernet standard has evolved from a 10 Mb/sec standard to a 100 Mb/sec standard to a 1 Gb/sec standard and, more recently, a 10 Gb/sec Ethernet standard, IEEE 802.3ae entitled *Local and Metropolitan Area Networks—Part 3: Carrier Sense Multiple Access with Collision Detection (CSMA/CD) Access Method and Physical Layer Specifications—Media Access Control Parameters, Physical Layers and Management Parameters for* 10 *Gb/sec Operation* has been proposed.

In addition to creating a physical LAN by connecting host devices, an Ethernet switch may also be used to create virtual LANs (VLANs), which are one or more logical networks within a physical network. A VLAN may logically connect two or more components in the physical network to the logical exclusion of the other components. VLANs are often employed to create subgroup networks within a larger physical network without having to add or alter hardware. Since a VLAN by essence logically includes participants in the defined logical network, it provides a convenient way to ensure a communicative coupling between selected participants, although the VLAN does not provide perfect network security to those participants included.

Another widely-used component for network connectivity is a security/encryption engine. As the networking revolution has unfolded and connectivity has become more sophisticated, network security has become one of the primary connectivity and systems management concerns. Encryption systems such as secured sockets layer protocol (SSL) have been developed to protect the privacy of data being exchanged between a website and an individual node on a network, without adding appreciable latency. Although popular, SSL is just one possible scheme for protecting the privacy of data sent over public networks.

Load balancers are another class of common networking devices that are typically present in an aggregate of systems. Networks connected by one or more Ethernet switches may be composed of individual users, but may also include server farms requiring a distributed load between individual servers. A server, such as a file server, applications server, web server, or e-mail server, is typically a computer that provides services to another (client) computer. When multiple servers are connected to the same network switch, it may become necessary to distribute processing and data communications activity evenly across the servers of the network so that no single device becomes overwhelmed. Data load balancing is particularly important in networks when it is predicted that the data load will likely exceed the capacity of a single server. However, each of the servers must be capable of performing the same task. If one server becomes overwhelmed, requests are forwarded to another server with more capacity.

As examples of ubiquitous networking devices in need of unified management, the above-described network switches, security encrypters, and server load balancers arose separately as distinct devices to answer specific networking needs. The separate evolution has resulted in an undesirable disparity in the maintenance, troubleshooting, and management of these and many other networking devices. Further, during times of heavy loading, data congestion can often disrupt or freeze the disparate management data channels to the devices, i.e., the congestion often impairs network management at the time management is needed most.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is generally directed to a method and apparatus for the provision of unified systems and network management of aggregates of separate systems. In this regard, a unified systems manager (USM) is introduced, which unifies disparate computing and networking systems and can control the unified systems, typically using a single management data flow. In some embodiments, a VLAN is reserved for management data flow and/or the VLAN gives preference to management data flow. This assures that management functions continue separately from user data flow, which may become impaired. In some variations a buffer that gives preference to management data flow is also used. The VLAN is typically a substantially intra-box VLAN, that is, the VLAN is mostly disposed within a system of communicatively coupled components, often within one package. The management VLAN of a USM may also use pre-configured IP addresses for each managed component.

According to one example implementation, the USM unifies common networking elements such as a security system using secure sockets layer (SSL), a data load balancer, and a data switch. The USM may employ one or more system managers to control the combined functions of these example networking devices under a single data management flow, as will be discussed below. In another example embodiment, a packet handler is added as another example component to the USM. The devices being managed and/or the system manager(s) use a virtual local area network (VLAN) dedicated to management data flow so that the USM remains functional and available to receive management instructions and to perform management tasks even when the user data flow (non-management data flow) is impaired. Alternate embodiments of the USM will be more fully developed below.

An example architecture for the USM will be presented first below, showing how the various example subcomponents of a USM are communicatively coupled into a single entity, for management purposes. According to another aspect of the invention, after the example architecture is presented, the integrated management system will then be presented, showing how the communicatively coupled components of a USM share a dedicated, substantially internal VLAN to isolate management data flow from the general purpose user data flow being processed by the USM. The management VLAN aspect of the invention assures a separate channel for management functions when they are needed the most: when the general user data flow is impaired.

EXAMPLE ARCHITECTURE OF THE USM

Figure 1:
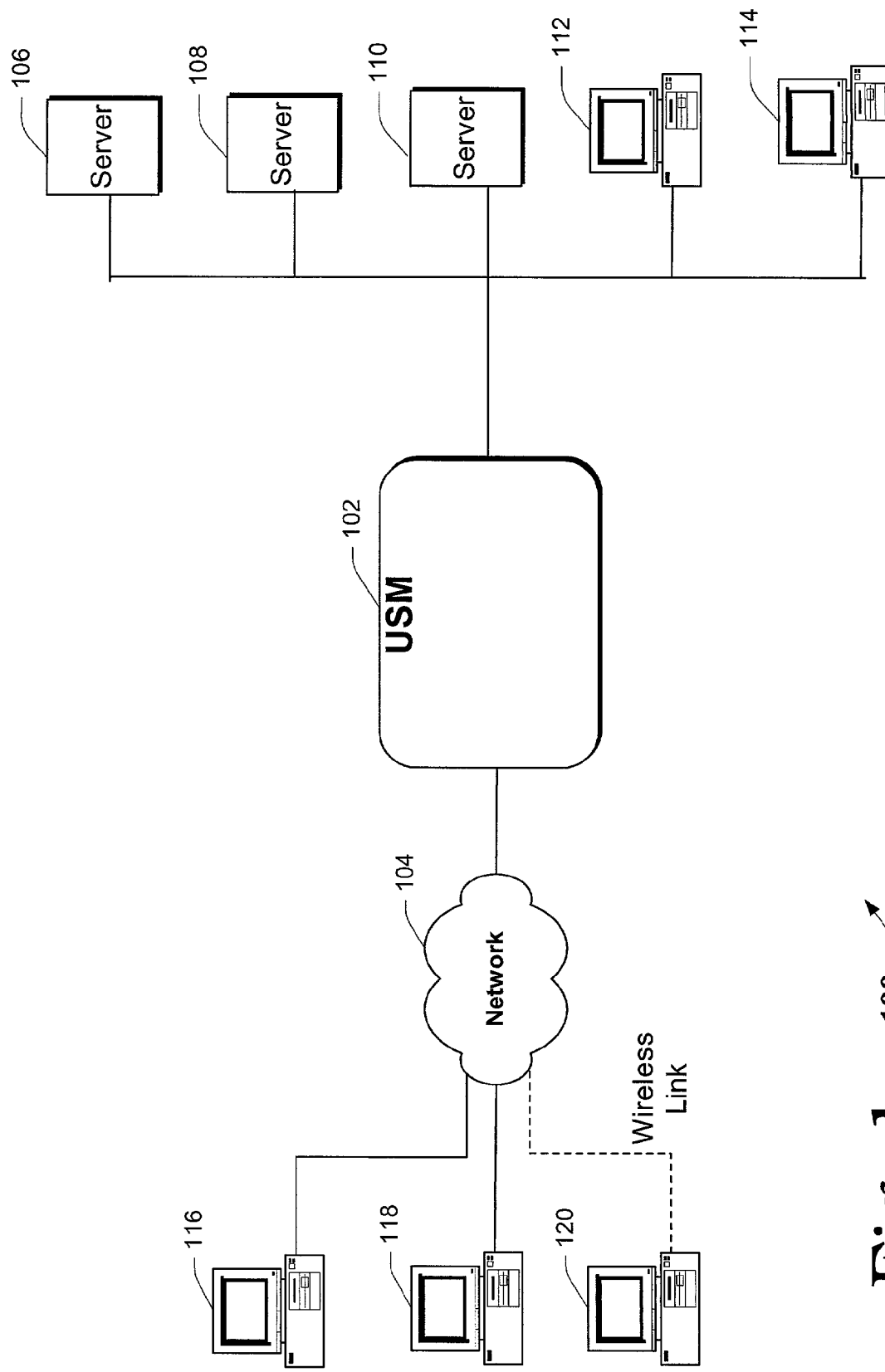
FIG. 1 is a block diagram of an example computing network providing an example environment for practicing some embodiments of the invention.

Turning to FIG. 1, a block diagram of an example computing network 100 is presented incorporating a USM 102, according to one example implementation of the invention. The USM 102 is connected through ports and/or network interface cards to a network 104 and to multiple separate systems 106-114, which may be a bank of servers and/or other computing systems providing similar services. The network 104 is connected, in turn, to multiple clients 116-120 as illustrated. If a client 116 requests content from a server 106-110 in a secure exchange, the USM 102, containing selected example networking devices united under a single management VLAN, can perform a combination of services, for example packet handling, SSL cryptography, and data switching without resorting to a plethora of different devices. If the data load is heavy the USM 102 can perform load balancing between the servers 106-110. Not only does the USM 102 combine functions and disparate hardware into a single device, but the device can be managed with a single integrated management system, as will be discussed more fully below. That is, the combined/fused functions and/or hardware components appear as one for management functions, such as configuration, monitoring, and troubleshooting.

Although the USM 102 is shown as a single module disposed in a computing network 100, in an alternate implementation a USM 102 could also be implemented as several modules, such as printed circuit boards and/or cards, coupled to a computing device 100 and maintaining a single management system between the several modules. A person having ordinary skill in the art will appreciate that a computing network 100, suitable for practicing some embodiments of the invention, may contain additional or different components.

Figure 2:
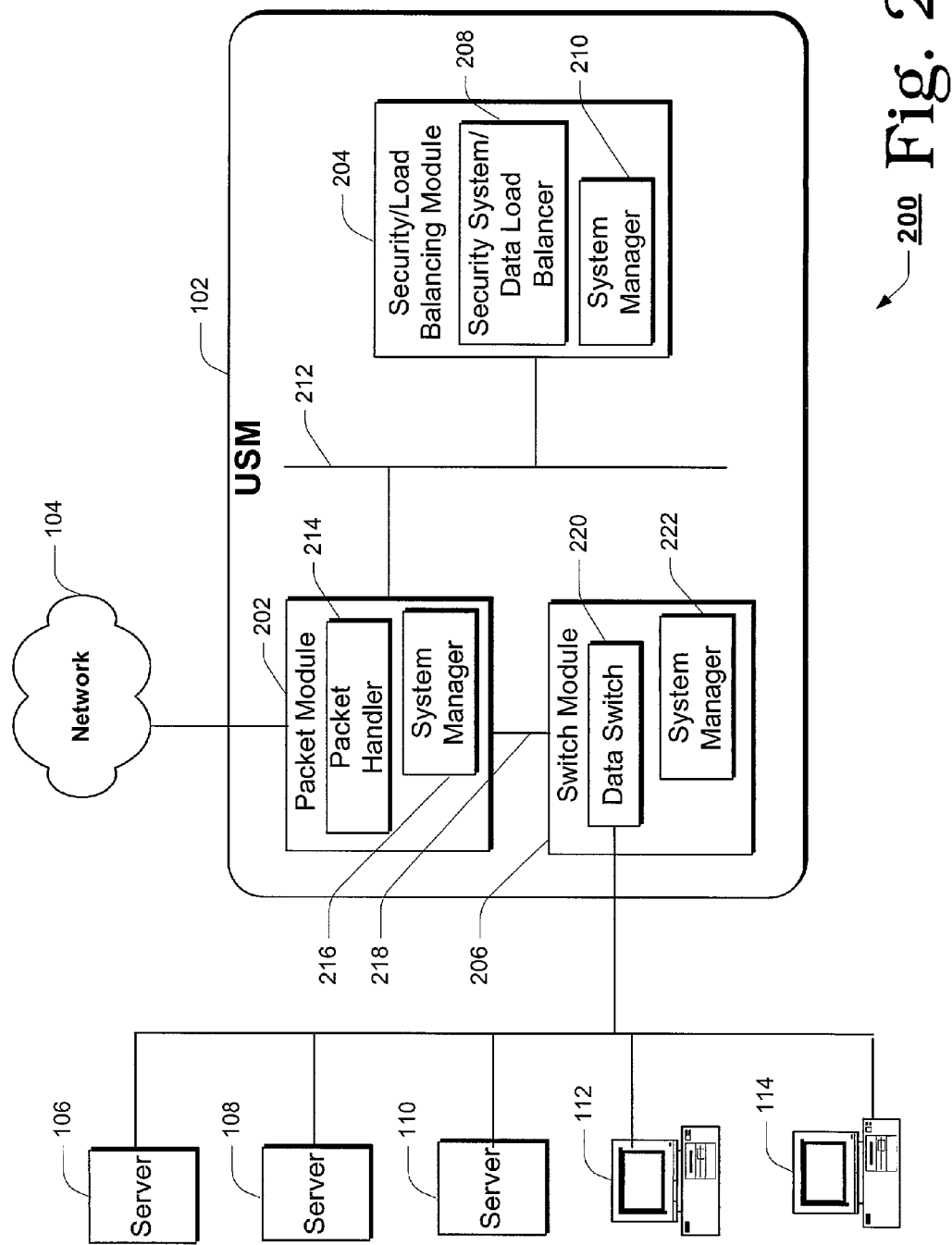
FIG. 2 is a block diagram of an example unified systems manager (USM), in accordance with an example implementation of the present invention.

FIG. 2 is a block diagram of an example embodiment of a USM 102 depicted as comprising a packet module 202, a security/load balancing module 204, and a switch module 206, each module with its own security manager 210, 216, 222. Although this embodiment unites these common networking elements and security managers 210, 216, 222 into a single package under a unified VLAN management system, many other components could be included. In this embodiment, the security system and the data load balancer are combined ("fused") into a single security system/data load balancer 208 entity, which in this instance is located within a single security load balancing module 204. The security and load balancing functions are depicted as fused to illustrate that a system manager 210 included in the security/load balancing module 204 may benefit more than one device and/or function with management services.

In one implementation, the security system component of the fused security system/data load balancer 208 is an SSL data encrypter/decrypter that automatically protects the privacy of a data exchange. The data load balancer component may be any load balancer that divides data traffic between multiple servers 106-110. Thus, functions and devices that may be unified under a single intradevice management VLAN of the invention can be very diverse.

The security/load balancing module 204 is communicatively coupled, for instance by a bus 212, to a packet module 202 that includes an Internet protocol (IP) packet handler 214, which will be discussed in greater detail below. The second module 202 may have network interface cards, ports, and/or other means to exchange data with external data sources 106-114. The packet module 202 also includes a system manager 216, in this case, another "discrete" system manager 222 that communicates with other discrete system managers, such as the system manager in the security/load balancing module 204. In variations, there may be only one overall system manager used for the entire USM 102 and communicatively coupled to all elements to be included in the management VLAN of the USM 102.

The packet module 202 is communicatively coupled by a bus and/or other link 218 to a switch module 206 that includes a data switch 220 and/or demultiplexer and a system manager 222. The data switch 220 is typically connected to a bank of servers 106-110 and/or other computing devices 106-114. There are many functions and aspects of a network switch (or similar device) that may be managed effectively by a system manager 222 of the invention. For example, the system manager 222 can managed data flow, congestion, protocol usage, hash table performance, and a host of other functions, making the management information available to other system managers 210, 216 and/or a remote central manager.

Figure 3:
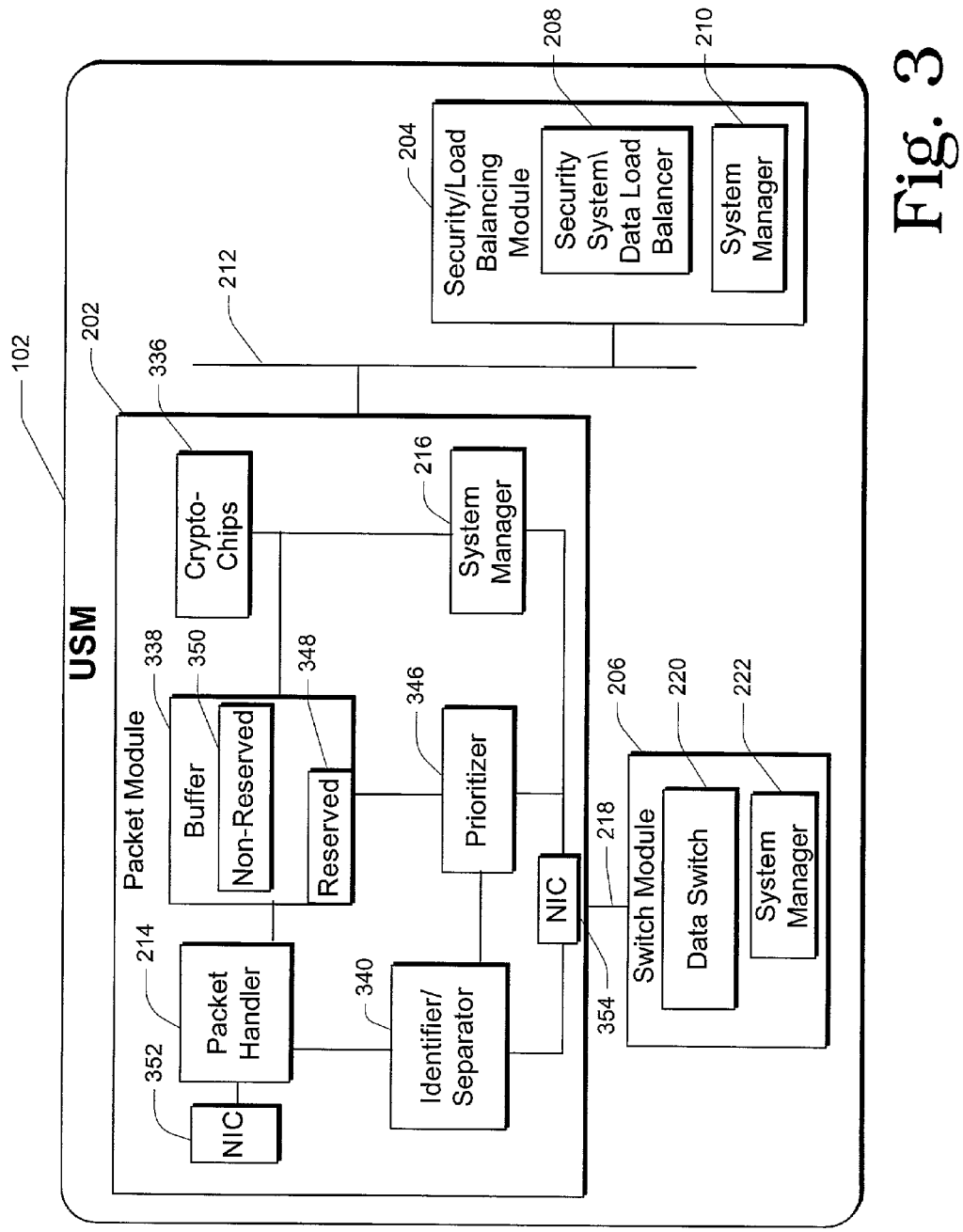
FIG. 3 is a more detailed block diagram of a unified systems manager (USM), in accordance with an example implementation of the present invention.

FIG. 3 is a block diagram, in greater detail, of an example USM 102. In this embodiment, the security system and data load balancer 208 are substantially combined as an example single entity in the security/load balancing module 204, as in FIG. 2. Since the single entity security/load balancing module 204 may be implemented using processors and code or may be implemented purely, or mostly, in chip circuitry, a system manager 210 can be capable of bringing various hardware/software combinations under the management of a USM 201. The security/load balancing module 204 is communicatively coupled, in one instance by a PCI bus 212, to the packet module 202. This illustrates that an intradevice management VLAN of a USM 102 may be implemented over many combinations of data connections within the same device(s), for example, a management VLAN could have an optical leg, a wireless link leg, an ethernet leg, and a PCI bus 212, each leg allowing devices and/or functions to participate in the management VLAN in various ways.

Besides a data packet/datagram handler 214, the packet module 202 may also contain cryptographic chips 336 for cryptographic offload, for instance as part of the security system of the security/load balancing module 204, and various network interface cards (NICs) 352, 354 for receiving and sending data. The illustrated cryptographic chips 336 are coupled to the system manager 216, however, in some variations only selected components of a device may be included in the management VLAN of a USM 102 as desired. A USM can include devices and modules not included in the management VLAN, such as modules to which bulk processing can be offloaded from more essential components. A first NIC 352 connects the packet handler 214 to one or more clients, for example through the Internet. A second NIC 354 may be used if the connection 218 between the packet module 202 and the switch module 206 requires it. The various interfaces that a USM 102 may contain can be coupled to the management VLAN and managed/monitored/configured dynamically, and/or may serve as connection points for adding other internal or external modules to participate in a management VLAN of the invention. In the illustrated embodiment, the packet handler 214 performs standard IP packet processing functions and may participate in data buffering and other operations as described below.

In accordance with another aspect of the invention, the USM 102 may contain one or more data buffers. A buffer 338 is depicted for convenience in the packet module 202, however, the buffer 338 could be implemented in any physical or logical place in the USM 102. An identifier/separator ("identifier") 340 receives data packets from the data packet handler 214 and differentiates management data packets from user data packets. Although illustrated as a discreet module, the identifier 340 may be integrated with a packet handler 214 and/or the circuitry fabric and/or software, if any, of the USM 102.

A prioritizer 346 monitors the buffer 338 for the availability of buffer space, and gives priority to the management data over the user data for buffer space, for instance, when there is data congestion and/or a shortage of buffer space. The prioritizer 346 assures that user data flow cannot pre-empt management data flow, even during periods of excessive user load. The prioritizer 346 also prevents the loss of a management data packet if incoming data packets arrive faster than they can be passed to one of the system managers 210, 216, 222 and/or copied to a congested buffer. Lost data packets would cause lost connections between system managers 210, 216, 222 and defeat the purpose of having a system management VLAN that is particularly needed during periods of excessive user data load and/or when there is a data deadlock or other problem.

In one example embodiment, the prioritizer 346 reserves a quota of reserved buffer space 348 for management data. Upon data packet arrival, the prioritizer 346 checks to see if non-reserved buffer space 350 is immediately available, and stores the management data (and user data) in the non-reserved buffer space 350 if available. If non-reserved buffer space 350 is unavailable, the prioritizer 346 consults the reserved buffer space 348 for possible storage of the management data. If both non-reserved buffer space 350 and reserved buffer space 348 are unavailable, the prioritizer 346 waits for any non-reserved buffer space 350 or reserved buffer space 348 to become available, and gives priority for buffer space to the management data.

Although the USM 102 is depicted in modular form for the sake of illustration, parts of a USM 102 could be implemented as any combination of hardware and/or software components, subcomponents, objects, routines, and subroutines. Those skilled in the related arts will appreciate that a USM 102 could be implemented in a variety of configurations with variances in the parts used, without departing from the spirit and scope of the invention.

Integrated Management System

Referring back to FIG. 2, system managers 210, 216, 222 within the packet module 202, the security/load balancing module 204, and the switch module 206 implement management instructions received from outside the USM 102 and/or generated inside the USM 102. Thus, the system managers 210, 216, 222 implement management instructions and control, configure, troubleshoot, and/or monitor (collectively, "manage") their respective modules 202, 204, 206 and components thereon. The system managers 210, 216, 222 may also generate their own internal management instructions, and share the management instructions with each other in controlling the USM 102.

Although the USM 102 is depicted with three system managers 210, 216, 222 the number of system managers implemented in a given embodiment of the invention may be variable without departing from the spirit and scope of the invention. The illustrated embodiment combines elements of the invention into three modules 202, 204, 206, but elements of the invention could be grouped in any convenient manner, and a system manager could be included with each convenient grouping of elements, if desirable. A given grouping of elements may not need a system manager, if the grouped elements do not need managing, for example, in the case of a group of elements having static, unvarying functions.

In this embodiment, the system managers 210, 216, 222 are linked using a VLAN internal to the USM 102, that is, an intradevice VLAN. The internal VLAN is reserved for management data flow, so that management may proceed when the user data flow is inoperable, in need of monitoring, and/or in need of configuration. In one implementation of the invention, a 16-bit value and a 12-bit value each having constant offsets from the start of a data packet are used as one or more VLAN tags to distinguish management data packets from user data packets. Separation of management data packets and user data packets based on a VLAN tag results in minimal performance degradation in the processing of the user data. Utilizing the VLAN tag value, rather than a priority tag value, also assures that management of the USM 102 prevails even when excessive user data packets should be claiming maximum priority.

Although dynamically configured IP addresses may be used as the VLAN tags, pre-configured IP addresses reserved for the participants in the VLAN 336 are preferably used for the VLAN tags, that is, the system managers 210, 216, 222 may be assigned IP addresses in a specified range, for example, the range of 192.0.2.*, where "*" is variable and designates the specific system manager or component. Pre-configured IP addresses have the advantage of saving processing overhead and mistakes that occur when IP addresses are allocated and configured during runtime. Pre-configured IP addresses also avoid the management deadlock caused by not being able to receive or transmit an allocated IP address because the IP address has not yet been created. The reserved IP address included as a VLAN tag in each management data packet may be used as a destination address of a particular system manager 210, 216, 222, or, a management data packet may be filtered from a user data packet on the basis of the VLAN tag/IP-address without being sent to the component or system manager bearing the IP address, as in the case of discriminating between management data packets and user data packets for assigning packets to a buffer.

In a variation, the system managers 210, 216, 222 of the USM 102 could be linked with dedicated hardwiring. However, in the illustrated embodiment, the management data is configured so that all three modules 202, 204, 206 can communicate using IP packets, for example on an internal Ethernet link and/or PCI bus also used by the user data. In variations, a USM 102 could be implemented by configuring native management code used by an Ethernet embodiment of the data switch 220 to be usable by the system managers 210, 216, 222 or conversely, by configuring the system managers 210, 216, 222 to use the unadulterated native management code of the Ethernet switch 220.

Figure 4:
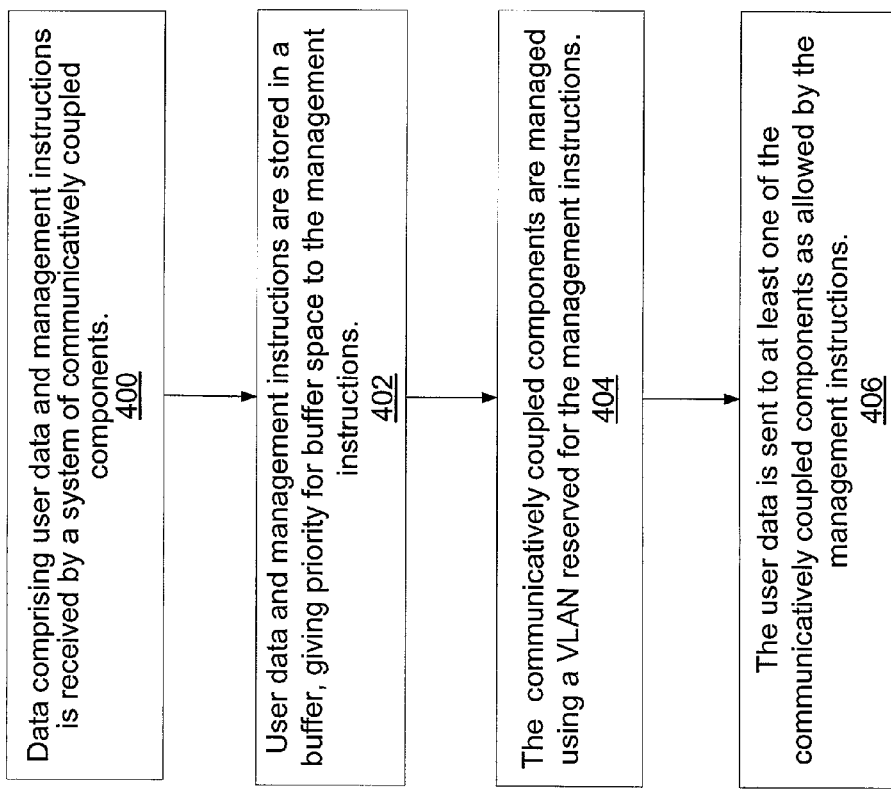
FIG. 4 is a flow chart of an example method of implementing a USM in accordance with the teachings of the present invention.

FIG. 4 is a flowchart of an example method of the invention. Data comprising user data and management instructions is received by a system of communicatively coupled components 400. A management instruction may be a command and/or request received from an external managing entity, or may be a management instruction generated by a communicatively coupled element within the USM 102. The communicatively coupled components may include typical networking devices, such as a packet module 202, a security/load balancing module 204, and a switch module 206. The user data and the management instructions are stored in a buffer, giving priority for buffer space to the management instructions 402. The communicatively coupled components are managed using a VLAN reserved for the management instructions 404. The user data is sent to at least one of the communicatively coupled components as allowed by the management instructions 406. Each communicatively coupled component may then processes the data according its usual function as managed by the system managers 210, 216, 222 and/or by management instructions received from an external source. That is, the communicatively coupled components perform their usual routine processing tasks under the management of the USM 102.

Figure 5:
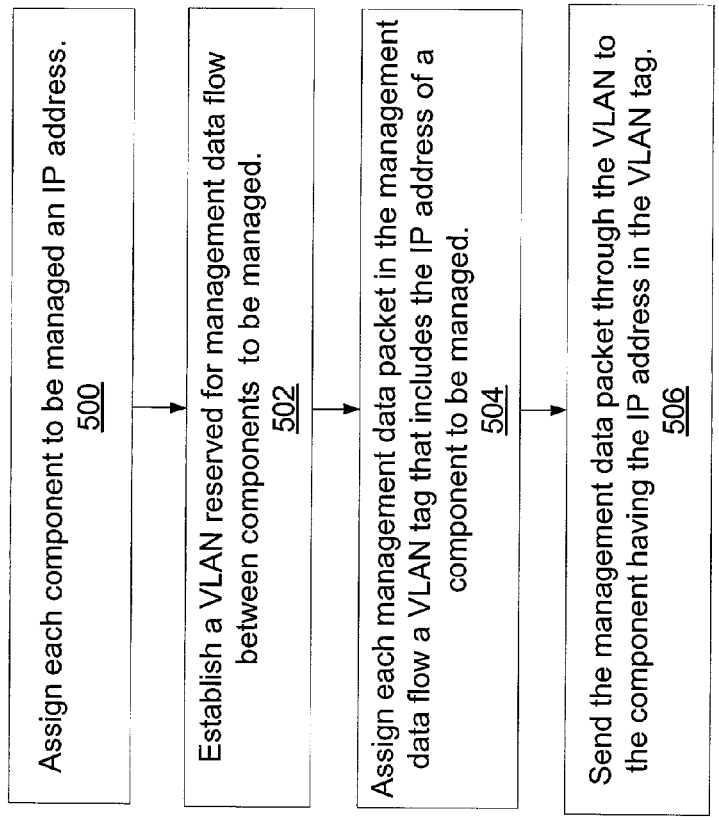
FIG. 5 is a flow chart of an example method of managing elements of an example USM, in accordance with one aspect of the present invention.

Although the method is described as managing components that perform functions such as security encrypting/decrypting, data load balancing, switching/demultiplexing, and/or buffering during runtime, one or more management instructions can be used for management operations not during runtime. Thus, remote configuring or self-configuring of the elements of the USM 102 can be performed in the USM 102 or by the USM 102 outside of runtime. Monitoring the status of the modules and components inside the USM 102 or externally connected to the USM 102 can also be accomplished by the USM 102 outside of runtime. FIG. 5 shows a flowchart of an example method of communicatively coupling the components of a USM, in accordance with one aspect of the invention. USM 102 components to be managed are each assigned an IP address 500. Components receiving an IP address, such as a preconfigured IP address, may include the security system/data load balancer 208, the data switch/demultiplexer 218, the packet handler 212, the buffer 338, and any other components for is which management is desirable. Components to be assigned an IP address may also include system managers 210, 216, 222 if system management functions are logically and/or physically delegated to discrete system manager components. A VLAN is reserved for components and/or system managers 210, 216, 222 that implement management data/instructions, including components that separate management instructions from user data, if necessary 502. Each management data packet is assigned a VLAN tag that includes the IP address of a USM component to be managed 504. The management data packets are sent through the VLAN to the components and/or system managers 210, 216, 222 having the assigned IP addresses 506. Through this method, the VLAN allows the flow of management data inside a USM 102 regardless of the status of the user data flow. Configuring, pre-configuring, monitoring, troubleshooting, and other management functions proceed independently from the user data flow with minimal performance degradation in the processing of the user data.

Figure 6:
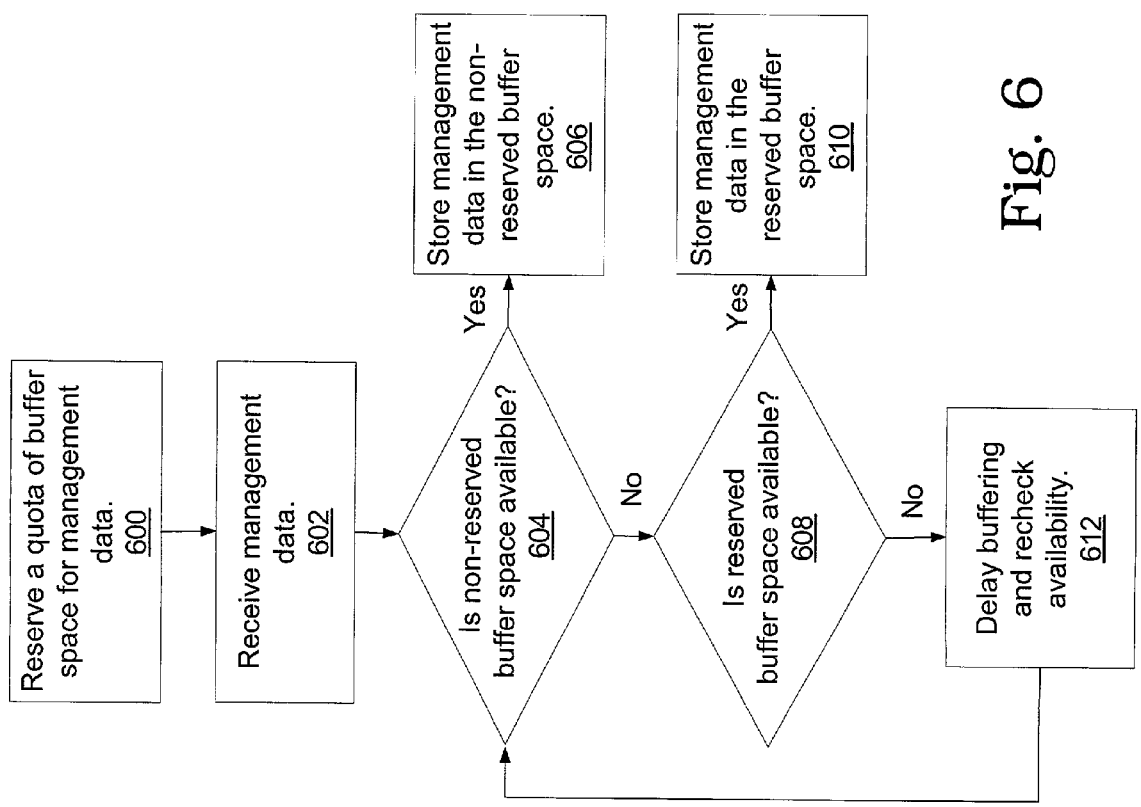
FIG. 6 is a flow chart of an example method for buffering management data, in accordance with one aspect of the present invention.

FIG. 6 shows a flowchart of an example method of buffering management data and giving priority to the management data for buffer space, in accordance with one aspect of the invention. A quota of buffer space 348 is reserved for management data 600. Upon receiving 602 management data, a buffer 338 is checked to see if non-reserved buffer space 350 is immediately available 604. If non-reserved buffer space 350 is available, then management data (and user data as well) are stored in the non-reserved buffer space 350 (606). If non-reserved buffer space 350 is not available, the buffer 338 is checked to see if the reserved buffer space 348 for storage of the management data is available 608. If reserved buffer space 348 is available, the management data is stored therein 610. If both reserved buffer space 348 and non-reserved buffer space 350 are unavailable, storage of the management data is delayed until non-reserved buffer space 350 or reserved buffer space 348 becomes available 612. The method assures that when one or more buffer(s) 338 are used in a method of the invention, the management data always receives first priority for storage in the buffer(s) 338.

Figure 7:
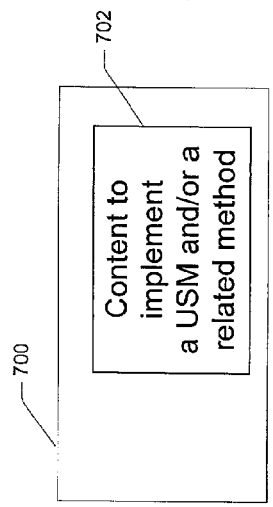
FIG. 7 is a block diagram of an example storage medium comprising a plurality of executable instructions which, when executed, cause an accessing machine to implement one or more aspects of the innovative USM of the present invention.

FIG. 7 is a graphic representation of an article of manufacture comprising a machine-readable medium 700 having content 702, that causes a machine to receive user data and management instructions; to communicatively couple components, such as a security encrypter/decrypter, a data load balancer, and a switch/demultiplexer to process the user data; to send the user data to at least one of the communicatively coupled components; and to manage the communicatively coupled components using a VLAN reserved for the management instructions. The content may also cause a machine to buffer the user data and the management instruction, giving the management instruction priority over the user data for buffer space. In one embodiment, the security encrypter/decrypter uses SSL protocol, the data load balancer is a server load balancer, and the data switch/demultiplexer is a network switch, such as an Ethernet switch.

The management instruction can be an internal management instruction generated by a component, such as the encrypter/decrypter, the data load balancer, and/or the switch/demultiplexer, and/or a system manager. The management instruction can also be an external instruction received from outside the USM 102.

The USMs and methods of the invention may be provided partially as a computer program product that may include the machine-readable medium. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media suitable for storing electronic instructions. Moreover, parts of the invention may also be downloaded as a computer program product, wherein the program may be transferred from a remote computer to a requesting computer by way of data signals embodied in a carrier wave or other propagation media via a communication link (e.g., a modem or network connection).

While the USMs and related methods have been described in terms of several embodiments, those skilled in the art will recognize that the invention is not limited to the embodiments described but can be practiced with modification and alteration within the spirit and scope of the appended claims. The description is thus to be regarded as illustrative instead of limiting.

What is claimed is:

1. A method, comprising:
   receiving data comprising user data and management instructions in a system of communicatively coupled components;
   managing the communicatively coupled components using a virtual local area network (VLAN), the VLAN reserved for transmitting only the management instructions but not the user data;
   identifying a packet as containing the management instructions by a VLAN tag that has a constant offset from a start of the packet and has a value of a pre-configured Internet Protocol (IP) address; and
   sending the user data to at least one of the communicatively coupled components as allowed by the management instructions.

2. The method of claim 1, further comprising storing the user data and the management instructions in a buffer, giving priority for buffer space to the management instructions.

3. The method of claim 1, further comprising generating a management instruction within the system of communicatively coupled components using at least one system manager within the system of communicatively coupled components.

4. A hardware apparatus, comprising:
   a data receiver resident on the hardware apparatus to input information comprising user data and management instructions into a system of communicatively coupled components; and
   at least one system manager resident on the hardware apparatus to administrate the communicatively coupled components using a virtual local area network (VLAN), the VLAN reserved to transmit only the management instructions but not the user data, wherein the at least one system manager identifies a packet as containing the management instructions by a VLAN tag that has a constant offset from a start of the packet and has a value of a pre-configured Internet Protocol (IP) address.

5. The apparatus of claim 4, further comprising a buffer to store the user data and the management instructions and to give priority for buffer space to the management instructions.

6. The apparatus of claim 4, wherein the at least one system manager in the system of communicatively coupled components performs at least one of managing a component, configuring a component, monitoring a component, and generating a management instruction within the system of communicatively coupled components.

7. A method, comprising:
   receiving data comprising user packets and management packets in a system of communicatively coupled components;
   managing the communicatively coupled components using a virtual local area network (VLAN), the VLAN reserved for transmitting only the management packets but not the user packets;
   identifying a packet as one of the management packets by a VLAN tag that has a constant offset from a start of the packet and has a value of a pre-configured Internet Protocol (IP) address; and
   allocating available space in a first portion of a buffer to the management packets, the first portion reserved for the management packets.

8. The method of claim 7 wherein allocating available space in a first portion of a buffer comprising:
   if there is no available space in the first portion of the buffer, allocating available space in a second portion of the buffer to the management packets, the second portion shared by the management packets and the user packets.

* * * * *